April 26, 1960 — A. T. FLOWER — 2,934,594
SPREADERS FOR CONDUCTOR WIRES
Filed May 15, 1958

INVENTOR
ARCHIBALD T. FLOWER
BY
ATTORNEY

United States Patent Office 2,934,594
Patented Apr. 26, 1960

2,934,594

SPREADERS FOR CONDUCTOR WIRES

Archibald Thomas Flower, Glenside, Pa.

Application May 15, 1958, Serial No. 735,576

1 Claim. (Cl. 174—146)

This invention relates to spreaders for the wires of electrical transmission lines.

It is an object of the invention to provide a spreader, for mounting intermediate the poles, to support the transmission wires in spaced relation affording insulation and protection from wear due to the swinging of the wires when subjected to strong winds or elements of the weather such as snow and ice.

A further object of the invention resides in providing a spreader composed of parallel bars of relatively hard insulation material disposed in spaced relation to receive a series of transmission wires therebetween and having saddles for supporting the wires of relatively softer insulation material to protect the insulation of the wires from wear and contact with the bars.

A still further object of the invention resides in providing a spreader to which a bail or bridle may be connected for supporting a service line connected to the transmission wires.

Another object of the invention resides in providing a spreader composed of few parts which may be easily installed and is highly efficient in performing its function.

Other objects and advantages of the invention will be apparent during the course of the following specification.

Figure 1:
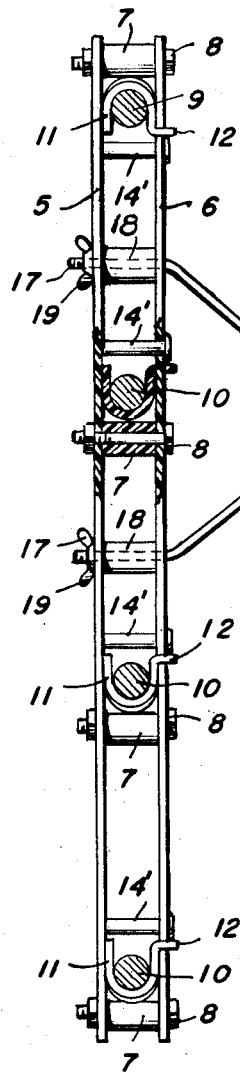
Figure 2:
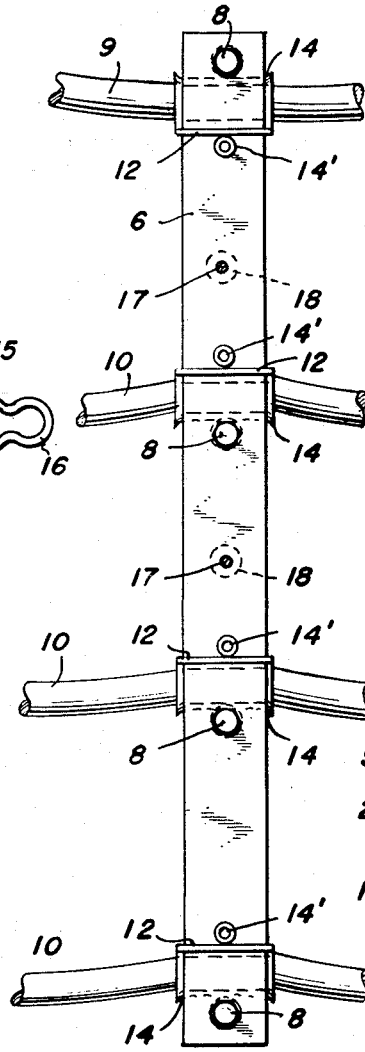
Figure 3:
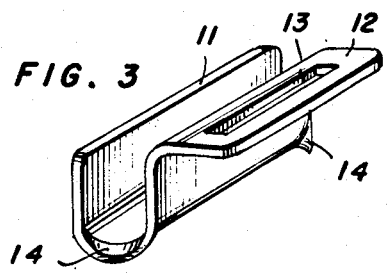

In the accompanying drawing forming a part of this specification and in which like numerals are employed to designate like parts throughout the same, Fig. 1 is an end elevation view of the spreader, partly in section, Fig. 2 is a side elevational view of the same, Fig. 3 is a perspective view of the saddle for supporting the wires, and Figs. 4, 5, 6 and 7 are detail views of modified forms of saddles for supporting the wires.

Referring to the drawing, the numerals 5 and 6 designate a pair of bars constructed of non-conductive material which is relatively hard. The bars are disposed in parallel relation and maintained in spaced apart relation by neoprene bushings 7 mounted on bolts 8 extending through the bars. The bushings are disposed in spaced relation throughout the length of the bars and in mounting the spreader on the wires, one of the end bushings is disposed above the messenger cable 9 while the remaining bushings are disposed beneath the transmission wires 10. While the spreader shown is provided with four bushings it is understood a lesser or greater number of bushings may be employed. A saddle 11 for embracing and supporting the wires is shown more clearly in Fig. 3. The saddle is formed of plastic material which is relatively soft and is U-shape with a lateral extension 12 extending outwardly from the upper edge of one wall. The saddle has a length slightly greater than the width of the bars and the extension 12 is provided with a longitudinal slot 13 to slidably receive one of the bars whereby the saddle is adjustably mounted on the bar. The bottom of the U-shape saddle is curved downwardly, at each end, to form a rounded lip 14 to permit free sliding movement of the saddle along the wires. When installed, the saddles rest on the bushings and the wires rest in the groove of the saddle but the saddle for the messenger cable is inverted to extend over the messenger cable between the cable and bushing. Pins 14' extend between and through the bars across the open side of the saddle to retain the wires in place.

When it is desired to connect a service line to the conductor wires, a bail or bridle 15 may be attached to the bars 5 and 6, intermediate their ends. The bail is formed of wires bent substantially V-shape with an eye 16 formed at the apex and its ends 17 bent to extend transversely through both bars. Bushings 18 are mounted on the ends 17 between the bars and nuts 19 threaded on the ends to firmly secure the bail in fixed position.

To assemble, the nuts of bolts 8 are removed which allows the bar 5 to be removed so the conductor wires can be seated in their respective saddles. After seating the wires in the saddles the bar 5 is replaced on the bolts 8 and upon tightening the nuts the bars 5 and 6 are drawn together thus compressing the saddles to hold the wires firmly seated in the saddle. The pins 14' extend between the bars 5 and 6 to retain the wires against accidental displacement.

Figure 4:
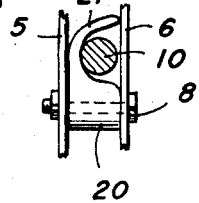

In Figs. 4, 5, 6 and 7 modified forms of the saddle for holding the wires between the bars 5 and 6 are shown. In Fig. 4 a bushing 20 having a hook 21 formed integral therewith is substituted for the bushing 7 and is held between the bars by bolts 8 with the hook extending longitudinally of the bars and engaging over the wires to be held between the bars.

Figure 5:
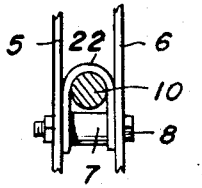

In Fig. 5 the saddle 22 is U-shape with the ends disposed between the ends of bushings 7 and the bars, the ends being apertured to receive the bolts 8. The wires are held between the bight portion of the saddle and the bushings 7.

Figure 6:
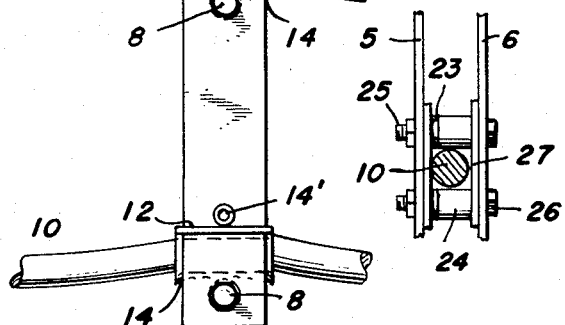

In Fig. 6, the saddle is formed by a pair of bushings 23 and 24 disposed in spaced relation and held between the bars by bolts 25 and 26. The bushings are formed of divided sections and disposed between the ends of the bushings and the bars 5 and 6 are washer plates 27 extending between and held by the bolts 25 and 26.

Figure 7:
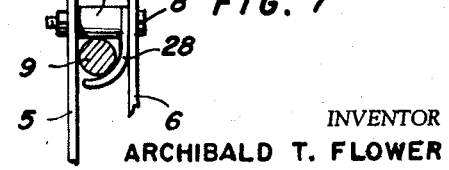

In Fig. 7, the saddle consists of a J-hook 28 disposed between one end of the bushing 7 and one of the bars having an aperture to receive the bolt 8.

The saddle shown in Fig. 4 is preferably made of aluminum or brass and the saddle shown in Fig. 7 is made of aluminum or similar material. The saddles shown in Figs. 5 and 6 are made of plastic material.

Having thus described my invention, I claim:

A spreader for conductor wires comprising a pair of parallel bars, a series of compressible U-shape saddles extending transversely of and between said bars for supporting the conductor wires, said saddles being of greater length than the width of said bars and having their ends flared outwardly, each saddle having a slotted lateral extension projecting outwardly from the upper edge of one wall for sliding engagement with one of said bars, and means connecting said bars together to compress said saddles and support the saddles in spaced relation.

References Cited in the file of this patent

UNITED STATES PATENTS

| | | |
|---|---|---|
| 302,358 | Rock | July 22, 1884 |
| 426,655 | Bennett | Apr. 29, 1890 |
| 631,321 | Owen | Aug. 22, 1899 |
| 1,209,286 | Goodwin | Dec. 19, 1916 |
| 1,622,741 | Seeger | Mar. 29, 1927 |
| 2,419,675 | Carpenter | Apr. 29, 1947 |

FOREIGN PATENTS

| | | |
|---|---|---|
| 597,417 | Germany | May 24, 1934 |